United States Patent
Kim et al.

(10) Patent No.: US 9,699,614 B2
(45) Date of Patent: Jul. 4, 2017

(54) POSITIONING ENVIRONMENT ANALYSIS APPARATUS, AND METHOD AND SYSTEM FOR PREDICTING LOCATION DETERMINATION PERFORMANCE OF TERMINAL USING THE SAME

(71) Applicant: ELECTRONICS AND TELECOMMUNICATIONS RESEARCH INSTITUTE, Daejeon (KR)

(72) Inventors: Joo-Young Kim, Daejeon (KR); Seung-Yong Lee, Daejeon (KR); Young-Su Cho, Daejeon (KR); Myung-In Ji, Daejeon (KR); Sang-Joon Park, Daejeon (KR); Sung-Woong Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/072,240

(22) Filed: Mar. 16, 2016

(65) Prior Publication Data
US 2016/0337804 A1   Nov. 17, 2016

(30) Foreign Application Priority Data
May 13, 2015   (KR) .......................... 10-2015-0066587

(51) Int. Cl.
*H04W 24/00*   (2009.01)
*H04W 4/02*    (2009.01)
*H04W 4/04*    (2009.01)

(52) U.S. Cl.
CPC ............. *H04W 4/025* (2013.01); *H04W 4/02* (2013.01); *H04W 4/023* (2013.01); *H04W 4/028* (2013.01); *H04W 4/04* (2013.01)

(58) Field of Classification Search
CPC ....... H04W 4/025; H04W 4/023; H04W 4/02; H04W 4/04; H04W 4/028
(Continued)

(56) References Cited

U.S. PATENT DOCUMENTS 8,712,690 B1 *   4/2014   White ................... G01S 5/0252
                                                       342/357.31
9,081,079 B2 *   7/2015   Chao ..................... G01S 5/0236
(Continued)

FOREIGN PATENT DOCUMENTS

KR   10-0441048 B1   7/2004
WO   WO 2004/070513 A2   8/2004

OTHER PUBLICATIONS

Paramvir Bahl et al., "RADAR: An In-Building RF-based User Location and Tracking System", IEEE, 2000, pp. 1-10.
(Continued)

*Primary Examiner* — Khai M Nguyen

(57) ABSTRACT

Disclosed herein are a positioning environment analysis apparatus, and a method and system for predicting location determination performance of a terminal. The presented system includes one or more collection devices for acquiring collected data that includes information about positioning resources for respective points, an LBS platform including a collection server for receiving the collected data from the one or more collection devices, and arranging and storing the collected data in a DB, and a positioning DB creation device for analyzing and processing the positioning resource information and creating a positioning DB to be used for location determination, and a positioning environment analysis apparatus for loading environment analysis data
(Continued)

from one or more of the collection server, the positioning DB, and a user terminal, and evaluating and predicting, based on the environment analysis data, location determination performance values for respective points in a service area, for respective positioning resources.

18 Claims, 13 Drawing Sheets

(58) Field of Classification Search
USPC .............................. 455/456.1, 456.5, 456.6
See application file for complete search history.

(56) References Cited

U.S. PATENT DOCUMENTS

| | | | |
|---|---|---|---|
| 2006/0019679 A1* | 1/2006 | Rappaport | H04W 64/00 455/456.5 |
| 2008/0108371 A1 | 5/2008 | Alizadeh-Shabdiz et al. | |
| 2011/0090081 A1* | 4/2011 | Khorashadi | G01S 5/0252 340/539.13 |
| 2012/0112958 A1 | 5/2012 | Alizadeh-Shabdiz et al. | |
| 2012/0150434 A1 | 6/2012 | Cho et al. | |
| 2013/0017842 A1* | 1/2013 | Gupta | H04W 64/00 455/456.1 |
| 2013/0079030 A1 | 3/2013 | Kang et al. | |
| 2013/0122935 A1* | 5/2013 | Das | H04W 4/028 455/456.3 |
| 2013/0177208 A1 | 7/2013 | Haverinen | |
| 2013/0179074 A1 | 7/2013 | Haverinen | |
| 2015/0189565 A1* | 7/2015 | Sung | H04W 48/16 370/332 |
| 2015/0226577 A1* | 8/2015 | Le Grand | H04W 4/026 702/94 |
| 2016/0234635 A1* | 8/2016 | Chen | H04W 4/02 |

OTHER PUBLICATIONS

Youngsu Cho et al., "WARP-P: Wireless signal Acquisition with Reference Point by using simplified PDR—system concept and performance assessment", ION 2013 Pacific PNT Meeting, 2013, pp. 1-6.

* cited by examiner

POSITIONING ENVIRONMENT ANALYSIS APPARATUS, AND METHOD AND SYSTEM FOR PREDICTING LOCATION DETERMINATION PERFORMANCE OF TERMINAL USING THE SAME

CROSS REFERENCE TO RELATED APPLICATION

This application claims the benefit of Korean Patent Application No. 10-2015-0066587, filed May 13, 2015, which is hereby incorporated by reference in its entirety into this application.

BACKGROUND OF THE INVENTION

1. Technical Field

The present invention relates generally to a positioning environment analysis apparatus and a method and system for predicting the location determination performance of a terminal using the apparatus and, more particularly, to an apparatus, method and system for analyzing the positioning environment of a designated service area using positioning resource information collected via site investigation and a positioning database (DB) upon configuring a platform for providing a Location-Based Service (LBS) in indoor space, thus analyzing the quality of a positioning service, such as the accuracy of a predicted location, in an integrated manner.

2. Description of the Related Art

With the rapid popularization of smart phones, a navigation device and some Social Network Services (SNS) which utilize smart phones require information about the location of users. Applications requiring such location information provide a navigation service using the provided user location information, or provide a Location-Based Service (LBS) such as a customized advertising service. Accordingly, a system for accurately determining the location of a user is urgently required in order to provide such a service.

To satisfy this requirement, in the case of outdoor spaces, a Global Positioning System (GPS) has been developed, and thus it is possible to very accurately determine locations in most areas, except for some downtown areas in which there are many buildings. However, in the case of indoor spaces, research into systems capable of accurately determining locations to such an extent that the systems are applicable to actual commercial services have been still conducted, and such systems are under development.

Meanwhile, one of the advantages obtained by the advent of smart phones is that the number of wireless Local Area Network (WLAN) (Wi-Fi) Access Points (APs) usable in indoor spaces has rapidly increased. In particular, in urban areas, Wi-Fi communication is available in most indoor spaces, and is readily accessible. In conformity with this tendency, research into indoor location determination (positioning) methods, which use previously and widely installed Wi-Fi networks, has been actively conducted.

One of various proposed location determination methods is a scheme for acquiring Received Signal Strength Indicator (RSSI) characteristics of Wi-Fi signals for respective points in a service area via detailed prior site investigation of the area and comparing the acquired RSSI characteristics with the RSSI characteristics of signals received by the user at a subsequent location determination step. This scheme is also referred to as "RF fingerprinting", because the physical characteristics of radio waves are different from each other at respective points in indoor space, similar to the unique patterns of fingerprints of respective persons, and such patterns are compared with the pattern of signals received by the user. (P. Bahl and V. N. Padmanabhan. "RADAR: an in-building RF-based user location and tracking system," in INFOCOM 2000. Nineteenth Annual Joint Conference of the IEEE Computer and Communications Societies. Proceedings. IEEE, 2000, pp. 775-784, vol 2).

More specifically, with the explosive popularization of Wi-Fi communication, in many indoor spaces, signals from multiple APs may be simultaneously received at one location. Radio waves, such as Wi-Fi signals, exhibit a characteristic whereby the RSSI decreases with increasing distance from a transmitter. However, in such an environment, since the degrees of attenuation of signals transmitted from respective APs differ from each other, RSSI values for respective APs are measured differently. At each point in indoor space, the distances between the point and APs are different from each other, and thus RSSI values for respective APs exhibit different characteristics at respective points. In this way, if the RSSI values expected to be received by the user at respective points are arranged and stored in a database (DB), the RSSI values may be used to determine the location of a pattern most similar to that of a received Wi-Fi signal to be the location of the user when the user receives the Wi-Fi signal.

Since indoor spaces have complicated structures due to the presence of ceilings, walls, etc., signals are subjected to series multipath fading, thus exhibiting very complicated signal characteristics. Therefore, pattern comparison-based positioning generally shows much better performance than other distance estimation or coverage-based positioning schemes. Further, due to such signal characteristics, it is very difficult to predict RSSI values at individual points, it is important to acquire accurate patterns. Accordingly, for location determination with high accuracy, a scheme for constructing a DB having physical attribute patterns by performing prior site investigation of a service area is generally performed.

In this way, radio waves such as Wi-Fi signals exhibit different physical characteristics at respective points in indoor space. Thus, when patterns related to the physical characteristics are arranged into a DB, the location of the user may be determined via subsequent pattern comparison. Infrastructure elements that can be used at this time are defined as "positioning resources", which are not limited to WI-Fi resources. IndoorAtlas has proposed a scheme for utilizing pieces of geomagnetic pattern information at respective points, other than Wi-Fi signals, for location determination (https://www.indooratlas.com/features, see U.S. Patent Application Publication No. 2013-0179074 and U.S. Patent Application Publication No. 2013-0177208).

In addition, available positioning resources may include mobile communication networks such as a Long Term Evolution (LTE) network, Bluetooth, Near Field Communication (NFC), atmospheric pressure information, etc. In the following description of the specification, a description will be made based on positioning that uses Wi-Fi communication for the convenience of description, but the positioning resources described in the present specification are not limited to Wi-Fi resources, and may include the above-noted positioning resources. Also, a DB constructed based on such site investigation is called a "positioning database", and hereinafter is also referred to as a "positioning DB".

As described above, a problem arises in that, in order to construct an accurate positioning DB, site investigation of a wide area must be performed in advance, and major expense is required for such site investigation.

To solve this problem, a dynamic collection idea for collecting positioning resource information while moving by using a collection device that is capable of tracking the location of a collector via a sensor has been presented. Further, recently, the number of cases where smart phones are used as collection devices has increased (Y. Cho et al., "WARP-P: Wireless signal Acquisition with Reference Point by using simplified PDR—system concept and performance assessment," Proc. the ION 2013 Pacific PNT Meeting, April 2013). Such ideas are advantageous in that the time and expense required to conduct a collection and site investigation procedure are effectively reduced, so that the data required to construct a positioning DB and a platform for an LBS using the DB (hereinafter referred to as an "LBS platform") may be rapidly and inexpensively collected.

However, even if dynamic collection is utilized, it is difficult to construct an LBS platform sufficient to provide actual LBS using only a single site investigation, and procedures, such as that shown in FIG. 1, must be performed repetitively, and thus the problem of expense still remains.

Upon constructing an actual platform, it is difficult to construct a positioning DB that exhibits sufficient location determination performance using only a single site investigation in most indoor spaces. In an actual environment, the number of infrastructure elements such as Wi-Fi APs is not sufficient and, as a result, there may occur the case where available positioning resources are insufficient. Further, during a site investigation procedure, there are various factors that negatively influence location determination performance, such as human error, whereby a collector collects positioning resources while moving along an incorrect path or in an incorrect direction. Accordingly, once a positioning DB is created via site investigation, a repetitive procedure for verifying location determination performance through actual positioning testing in a designated service area, detecting problems, and re-collecting positioning resources must be performed.

Such a procedure is intended to search for the cause of dissatisfactory performance using only an existing DB and to solve the cause in such a way as to detect the positioning environment of a designated service area, respond to insufficient infrastructure elements by installing additional infrastructure at suitable places when infrastructure elements are insufficient in a specific area, and re-collect data when it is determined that collected data is insufficient or erroneous. For actual LBS, the location determination performance at a level required by the user must be guaranteed, and thus this task must be repetitively performed until the performance is satisfactory. This procedure entails a lot of time and expense. In particular, a collector must personally visit a designated service area, conduct tests, and subsequently make adjustments, whereby further additional expenses are incurred in the case where the designated service area is located far away from the collector. This also acts as a fundamental problem in business expansion, such as overseas expansion, from the standpoint of the location information service provider.

Furthermore, in actual service, various positioning resources may be included in a positioning DB. In addition, a problem arises in that, upon performing location determination using respective positioning resources, the location may be determined using various positioning schemes, and thus it is difficult to know which resources and which scheme must be used to realize optimal location determination performance. In particular, in indoor spaces, the physical characteristics of positioning resources may greatly differ from each other for respective points, and thus the optimal combination of positioning resources and positioning scheme may also differ for respective regions in a service area. Hence, even if the optimal location determination system has been configured for a single region, another combination must be found when moving to another region or another floor. To solve this problem, there is required a device or a system capable of more accurately analyzing a positioning environment because it is difficult to find an optimal combination merely by conducting simple site tests.

In summary, even if the expense required for a site investigation procedure is reduced, a problem still remains in that unnecessary expenses attributable to repetitive site investigation and site verification are incurred, unless a scheme for efficiently constructing a platform in the entire system construction procedure is provided. Further, even if a location determination platform is constructed as desired, a problem also remains in that it is also difficult to find an optimal location determination combination using only simple site tests so as to provide an optimal positioning service by effectively exploiting such a platform.

As preceding technology related to the present invention, there are Korean Patent No. 0441048 (entitled "Method and System for Accessing Mobile Communication Terminal Position Determination Performance of Mobile Terminal by Using Wireless Communication Network and A-GPS"), and U.S. Patent Application Publication Nos. 2008-0108371 and 2012-0112958.

SUMMARY OF THE INVENTION

Accordingly, the present invention has been made keeping in mind the above problems occurring in the prior art, and an object of the present invention is to provide an apparatus, method and system which are configured to, when a service provider intending to provide indoor LBS collects positioning infrastructure information via a single site investigation and creates a positioning DB, analyze a positioning environment based on the positioning DB, so that the location determination performance in a service area may be predicted, and information about the cause of bad performance may be provided for an area in which poor performance is anticipated, by overcoming the limitations of existing location determination platform construction schemes upon providing an indoor positioning service based on a pattern comparison scheme.

Another object of the present invention is to provide an apparatus, method and system that can calculate information about the combination of positioning resources that enable the optimal performance to be obtained, the most suitable location determination scheme using the positioning resources, and the most suitable parameters when a positioning DB and a location determination platform constructed in a service area based on the results of analysis of the positioning environment are utilized.

In accordance with an aspect of the present invention to accomplish the above objects, there is provided a positioning environment analysis apparatus, including an environment analysis data loading unit for loading environment analysis data to be used for analysis of location determination performance from one or more of a collection server, a positioning database (DB), and a user terminal; and an analysis and prediction unit for evaluating and predicting, based on the environment analysis data, location determination performance values for respective points in a service area, for respective positioning resources.

The analysis and prediction unit may include a basic positioning environment analysis unit for detecting a present state of distribution of positioning resources by directly utilizing and analyzing the environment analysis data; a location determination performance prediction unit for deriving location determination performance values that are predicted when the positioning resources are used at respective points in the service area by processing and analyzing the environment analysis data; and a positioning data-based analysis unit for deriving both results of performing positioning at an actual site based on the environment analysis data, and location determination performance that is capable of being obtained from the results of performing positioning.

The information analyzed by the basic positioning environment analysis unit may include one or more of locations where patterns are generated for respective positioning resources, average Received Signal Strength Indicator (RSSI) values of signals collected for respective points, a number of transmitters for transmitting signals, a degree of skew relative to a true direction, and a difference from an average air pressure of an entire floor.

The location determination performance prediction unit may predict the location determination performance values by analyzing similarity between patterns of respective points constructed in the positioning DB.

The location determination performance prediction unit may be configured to measure signal distances from a receive sensitivity pattern at a point selected from among points for which the positioning DB is constructed, to receive sensitivity patterns at other points, search for a point having a shortest signal distance, and analyze the location determination performance values based on a distribution of the signal distances, wherein the similarity corresponds to the signal distances.

The location determination performance prediction unit may add certain noise to the receive sensitivity pattern at the selected point and repetitively simulate analysis of the location determination performance.

The location determination performance prediction unit may additionally predict an estimated location when positioning is performed using the positioning resources at respective points of the service area by processing the environment analysis data.

The positioning environment analysis apparatus may further include a weak point derivation unit for deriving weak points having poor location determination performance based on results obtained by the analysis and prediction unit; and an optimal system analysis unit for deriving, based on various location determination schemes and set values, location determination performance values that are predicted depending on location determination schemes usable at respective points in the service area and parameter values set in respective schemes, comparing the derived location determination performance values with each other, and then providing a location determination scheme and parameter information that exhibit optimal performance.

The positioning environment analysis apparatus may further include a visualization unit for displaying results obtained by the analysis and prediction unit, the weak point derivation unit, and the optimal system analysis unit; and a feedback unit for feeding back the results obtained by the analysis and prediction unit, the weak point derivation unit, and the optimal system analysis unit to a service provider.

In accordance with another aspect of the present invention to accomplish the above objects, there is provided a method for predicting location determination performance of a terminal, including loading, by a positioning environment analysis apparatus, environment analysis data to be used for analysis of location determination performance from one or more of a collection server, a positioning DB, and a user terminal; and evaluating and predicting, by the positioning environment analysis apparatus, location determination performance values for respective points in a service area, for respective positioning resources, based on the environment analysis data.

Evaluating and predicting the location determination performance values may include detecting a present state of distribution of positioning resources by directly utilizing and analyzing the environment analysis data; deriving location determination performance values that are predicted when the positioning resources are used at respective points in the service area by processing and analyzing the environment analysis data; and deriving both results of performing positioning at an actual site based on the environment analysis data, and location determination performance that is capable of being obtained from the results of performing positioning.

Deriving the predicted location determination performance values may be configured to predict the location determination performance values by analyzing similarity between patterns of respective points constructed in the positioning DB.

Deriving the predicted location determination performance values may include acquiring a receive sensitivity pattern of a point selected from among points for which the positioning DB is configured; measuring signal distances from the acquired receive sensitivity pattern at the selected point to receive sensitivity patterns at other points, and searching for a point having a shortest signal distance; and analyzing the location determination performance values based on a distribution of the signal distances, wherein the similarity corresponds to the signal distances.

Deriving the predicted location determination performance values may further include adding certain noise to the receive sensitivity pattern at the selected point, wherein the analysis of the location determination performance is repetitively simulated.

The method may further include, after evaluating and predicting the location determination performance values, deriving weak points having poor location determination performance; and deriving, based on various location determination schemes and set values, location determination performance values that are predicted depending on location determination schemes usable at respective points in the service area and parameter values set in respective schemes, comparing the derived location determination performance values with each other, and then providing a location determination scheme and parameter information that exhibit optimal performance.

The method may further include displaying results obtained from the evaluating and predicting the location determination performance values, the deriving the weak points having poor location determination performance, and the providing the location determination scheme and parameter information that exhibit the optimal performance; and feeding back the results, obtained from the evaluating and predicting the location determination performance values, the deriving the weak points having poor location determination performance, and the providing the location determination scheme and parameter information that exhibit the optimal performance, to a service provider.

In accordance with a further aspect of the present invention to accomplish the above objects, there is provided a system for predicting location determination performance of a terminal, including one or more collection devices for acquiring collected data that includes information about positioning resources for respective points; a Location- Based Service (LBS) platform including a collection server for receiving the collected data from the one or more collection devices, and arranging and storing the collected data in a database (DB), and a positioning DB creation device for analyzing and processing the positioning resource information and creating a positioning DB to be used for location determination; and a positioning environment analysis apparatus for loading environment analysis data from one or more of the collection server, the positioning DB, and a user terminal, and evaluating and predicting, based on the environment analysis data, location determination performance values for respective points in a service area, for respective positioning resources.

Each of the collection devices may periodically acquire information about times at which collection was performed, collection coordinates, and positioning resources, configure the collected data by bundling the acquired information into a single unit, store the collected data, and transfer the collected data to the collection server.

The positioning DB creation device may derive representative points at which patterns are to be generated, generate patterns for respective points using collected data near each representative point, and then create the positioning DB.

The positioning DB creation device may be configured to check the collected data received from the collection server, analyze collection coordinates, and then derive representative points, generate patterns by bundling collected data near each representative point and by obtaining averages of pieces of measured information for respective positioning infrastructure elements included in respective pieces of data, and create the positioning DB by bundling patterns generated at all representative points.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
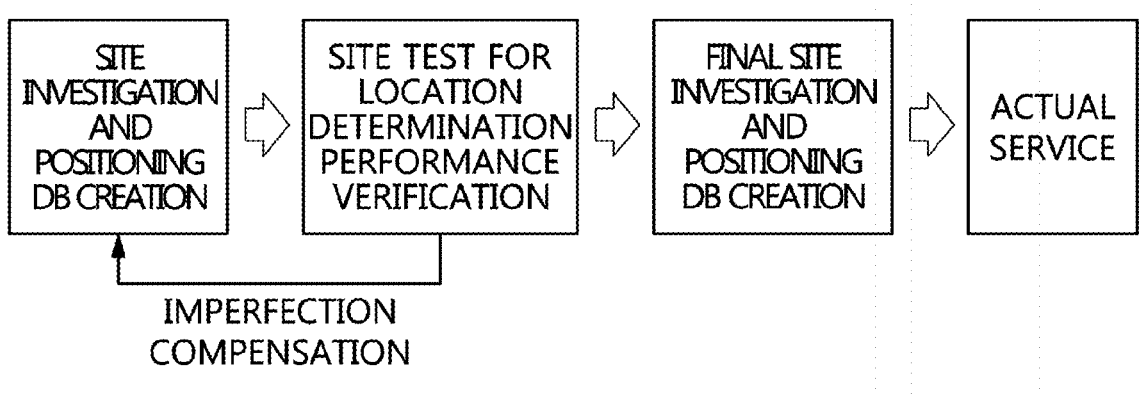
FIG. 1 is a diagram showing a conventional LBS platform construction procedure for LBS.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

The present invention is technically characterized in that a location information service provider (hereinafter referred to as a "service provider") may analyze the positioning environment of a designated Location-Based Service (hereinafter referred to as "service") area based on both positioning resource data, which is collected via site investigation during a procedure for constructing a platform for indoor LBS (hereinafter referred to as an "LBS platform") that uses a pattern comparison scheme, and a positioning DB, which is created using the positioning resource data, may calculate predicted location determination performance (i.e. positioning quality) in actual service in an integrated manner, and may provide information that enables an optimal LBS platform to be configured.

Further, the provision of a method for implementing an optimal location determination system based on the results of the analysis is also included in the scope of the present invention.

For this, the present invention provides a method or an apparatus that may analyze the present state of positioning resources in a service area by analyzing a positioning DB, may predict location determination performance when one positioning resource is utilized or multiple positioning resources are utilized together, and may derive an optimal location determination scheme and parameter set values therefor based on the location determination performance.

In the method or apparatus, 'location determination performance' denotes the perceived positioning quality, as experienced by a user based on a number of factors, such as reliability or availability, as well as positioning accuracy.

Figure 2:
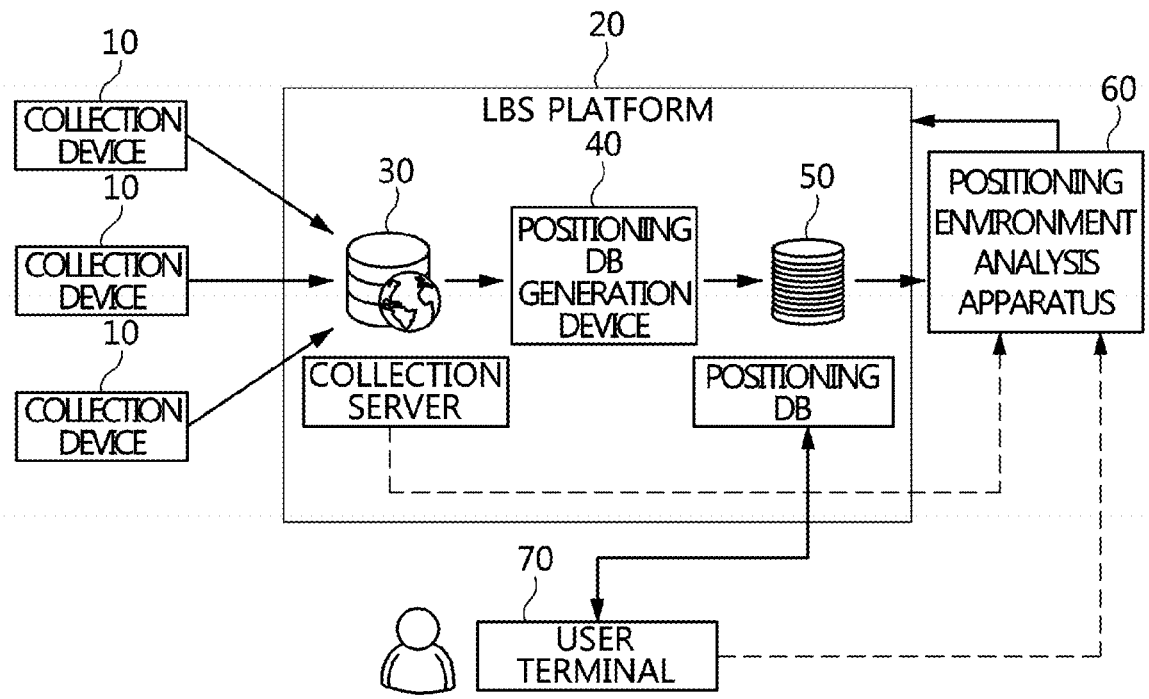
FIG. 2 is a configuration diagram showing a system for predicting the location determination performance of a terminal according to an embodiment of the present invention.
Figure 3:
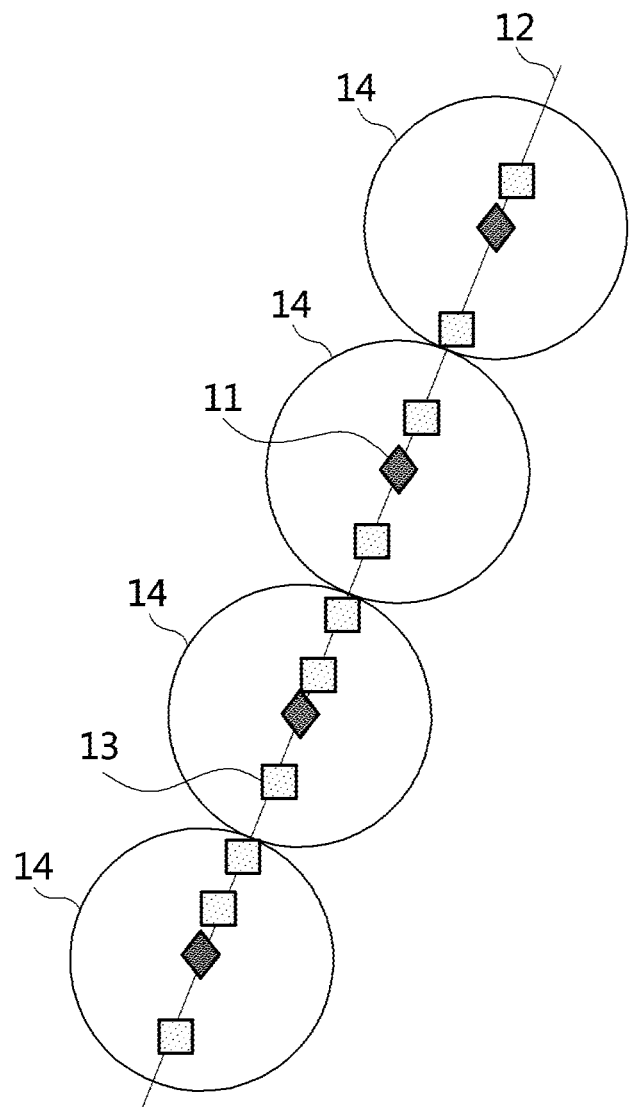
FIG. 3 is a diagram showing an embodiment of the configuration of representative points derived in the creation of a positioning DB.
Figure 4:
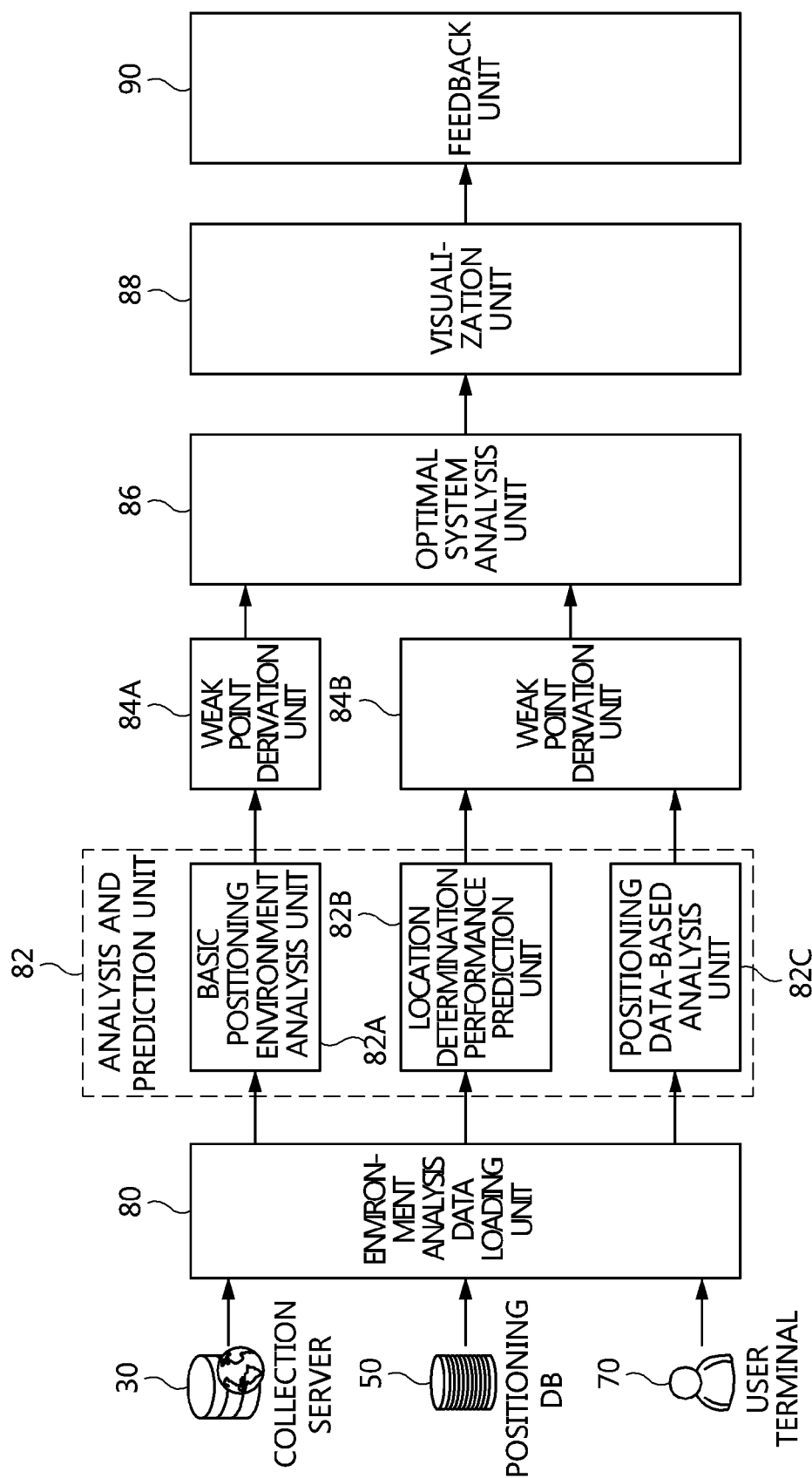
FIG. 4 is a configuration diagram showing the positioning environment analysis apparatus shown in FIG. 2.

FIG. 2 is a configuration diagram showing a system for predicting the location determination performance of a terminal according to an embodiment of the present invention, FIG. 3 is a diagram showing an embodiment of the configuration of representative points derived in the creation of a positioning DB, and FIG. 4 is a configuration diagram showing the positioning environment analysis apparatus shown in FIG. 2.

The system for predicting the location determination performance of a terminal according to an embodiment of the present invention includes collection devices 10, an LBS platform 20, and a positioning environment analysis apparatus 60.

Each of the collection devices 10 is equipped with a module capable of estimating in real time the location of a collecting person or collecting device and acquiring information about positioning resources such as Wi-Fi, Bluetooth, and a magnetometer, which will be utilized upon providing positioning service.

In each of the collection devices 10, a processing and storage module and a program, which are capable of acquiring collected data in which pieces of related information required to create a positioning DB, such as real-time location information, positioning resource information for each point, and collection time information are bundled, are installed.

Each collection device 10 periodically acquires information about the time at which collection was performed, collection coordinates, and positioning resource information (e.g. a list of Wi-Fi APs, Wi-Fi receive sensitivity for each AP, the values of x, y, and z axes of a magnetometer, the direction value of the magnetometer, the values of a barometer, a list of Bluetooth beacons, receive sensitivity for each beacon, etc.). The collection device 10 configures collected data by bundling the pieces of information, acquired in this way, into a single unit, stores the collected data, and transfers the collected data to a collection server 30 connected thereto in a wired or wireless manner.

The collection coordinates in the collected data have the format of latitude and longitude coordinates, which are required to indicate an absolute location. Meanwhile, the collection coordinates may be represented by assigning IDs to respective buildings, constructing, in advance, base building information, such as a reference location for the buildings, and utilizing the relative coordinates of the respective buildings. In addition, a separate coordinate system capable of indicating the collected locations may be used.

In accordance with the object of the present invention, which is intended to efficiently construct a location determination platform, other pieces of information may be included in addition to the collected data. As one of the other pieces of information, basic collection device module information, such as hardware information (e.g. Wi-Fi chipset information) used by the collection device 10 to collect each positioning resource, may be included. When the collection device 10 is a ready-made product, such as a smart phone, the basic collection device module information may be replaced with the model name of the corresponding product. The reason for including this information is that, when various collection devices are utilized, hardware components contained therein differ from each other, and the collection information between devices may differ from each other even in the same environment due to such differences, and thus module information is required for subsequent correction or the like.

The LBS platform 20 may receive environmental information from the positioning environment analysis apparatus 60.

The LBS platform 20 includes the collection server 30, a positioning DB creation device 40, and a positioning DB 50. Here, the collection server 30, the positioning DB creation device 40, and the positioning DB 50 may be implemented as separate devices, or may also be implemented as separate modules or programs in a single device.

The collection server 30 is connected to the multiple collection devices 10 in a wired or wireless manner, and includes a collection DB (not shown) for receiving pieces of collected data, which are collected at different times, from respective collection devices 10 and for arranging and storing the pieces of collected data in a DB.

The collection server 30 is configured to, when certain data is determined to be meaningless data upon configuring the collection DB, delete the meaningless data, thereby selectively acquiring data. As an embodiment thereof, a function of deleting information that is received and collected from unfixed positioning infrastructure (e.g. a mobile Wi-Fi AP) is included in such selective acquisition.

Further, when the positioning DB creation device 40 requests collected information corresponding to a specific condition so as to create a DB, the collection server 30 may search the collection DB and transmit data that satisfies the corresponding condition. Here, the specific condition may include the time of collection of data; place, such as a building in which the data was collected, the floor of the building, and the region; collected positioning infrastructure; and basic collection device module information, such as the type of collection device or specific hardware.

The positioning DB creation device 40 may be connected to the collection server 30 in a wired or wireless manner or may be included as a module or a program in the collection server 30 to load the collection DB, and may be equipped with a program or a module for processing the collection DB and creating a pattern DB that is used to provide positioning service for the user. Further, the positioning DB creation device 40 includes a module capable of transferring the pattern DB to the positioning DB 50.

The positioning DB creation device 40 creates the positioning DB 50 to be directly used for location determination by analyzing and processing positioning resource information collected at times and places desired by a service provider. The positioning DB creation device 40 may request only collected data that satisfies a specific condition from the collection server 30 so as to create the positioning DB. For the creation of the positioning DB to perform accurate location determination, various schemes may be used, and the following embodiments may be provided in the present invention.

In an embodiment in which the positioning DB creation device 40 creates the positioning DB, respective representative points at which patterns are to be generated are derived, patterns for the respective points are generated using collected data near the respective representative points, and then the positioning DB 50 is finally created. For this, the positioning DB creation procedure performs the step of checking collected data received from the collection DB, analyzing collection coordinates, and deriving representative points; the step of generating patterns by bundling collected data near each representative point and by obtaining the averages of pieces of measured information for respective positioning infrastructure elements included in the respective pieces of data; and the step of creating the positioning DB by bundling patterns generated at all representative points. Here, the step of deriving the representative points may be configured to, when information about networks on the map can be utilized, check collected links and select points that are spaced apart from each other on the corresponding links at regular intervals. If there is no network information, all collection coordinates are checked, the coordinates of edges in north, south, east and west directions, or in upward, downward, left, and right directions are obtained, and points arranged at regular intervals are generated based on the coordinates.

Meanwhile, a preferred example of a scheme for selecting representative points, bundling collected data near the representative points, and generating patterns may be illustrated, as shown in FIG. 3.

In FIG. 3, diamonds 11 indicate representative points. A straight line 12 indicates a link on the map on which collection is performed. Rectangles 13 indicate collected points. As described above, when network information may be received, the points 11 spaced apart from each other at regular intervals on the straight line (i.e. link) 12 are selected as representative points. Here, pieces of data 13 collected in circles 14 around respective representative points are used to generate patterns of the representative points. For the convenience of description, when positioning resources are limited to Wi-Fi resources, patterns are generated by averaging RSSI values for respective APs collected at various collection points, and all of the patterns for respective representative points, generated in this way, are bundled to create the positioning DB 50.

Meanwhile, in FIG. 2, the positioning DB 50 stores the physical characteristic information (i.e. a pattern DB) of positioning resources at the points in a service area, which are generated via the positioning DB creation device 40.

The positioning DB 50 may be directly transferred to a user terminal 70 in a wired or wireless manner, so that the user terminal 70 may directly calculate the location and then be provided with the service. The positioning DB 50 may be used in such a way as to compare pattern information (i.e. data for positioning), uploaded by the user terminal 70, in the LBS platform 20 and download only determined location values.

A preferred embodiment of the positioning DB 50 for performing such a function includes the following information, which may take different formats, or to which information may be added or subtracted, depending on the location determination scheme or system for exploiting the information. The positioning DB 50 may include building information such as the name of the building containing the indoor space for which the DB is created and the absolute latitude and longitude coordinates of the building; a list of positioning resources such as a list of Wi-Fi APs collected for respective representative points depending on the positioning scheme, or a list of Bluetooth beacons; positioning resource information such as received signal sensitivities for respective resources or the values of a magnetometer; search conditions required when requesting collected data, such as specific collection times, places, or collection devices; the time at which the positioning DB 50 was created; and information about the networks of an indoor path available in a positioning module, upon providing a service.

In FIG. 2, the user terminal 70 denotes either a terminal possessed by the user provided with the service or a program or an application installed in the terminal. Meanwhile, when the user is a device such as a robot, rather than a human being, the user terminal 70 may be either the device itself or a program or an application installed in the device.

The user terminal 70 may be provided with the positioning DB 50 from the LBS platform 20 and may subsequently independently perform positioning without making an additional connection, but may exchange information with the LBS platform 20 or the positioning environment analysis apparatus 60 depending on the type of user terminal.

As described above in the related art of the invention, in order to verify the performance of the constructed LBS platform 20 in site tests before service is provided, the user uses the terminal or the program to be actually used. At this time, examples of information exchange between the user terminal 70, the LBS platform 20, and the positioning environment analysis apparatus 60 include the delivery of acquired positioning data to the positioning environment analysis apparatus 60, or the direct delivery of positioning data from the user terminal 70 to the LBS platform 20 or the positioning environment analysis apparatus 60 depending on the type of service. Here, as the positioning data, positioning resource information acquired by the user terminal 70 to perform location determination is provided. In addition, information about measurement times, actual real-time locations, measuring terminals, estimated location values obtained by the terminals, the location determination schemes used to calculate the estimated locations, etc. may be included in the positioning data.

In FIG. 2, the positioning environment analysis apparatus 60 may be connected to the positioning DB 50 in a wired or wireless manner to load the positioning DB 50. The positioning environment analysis apparatus 60 is equipped with a program or a device for implementing the method for analyzing the positioning environment of a service area based on the positioning DB 50. The positioning environment analysis apparatus 60 includes a device for displaying related information, such as the results of analysis and logs, and a module for forwarding such related information to the LBS platform 20.

That is, the positioning environment analysis apparatus 60 may load environment analysis data including the positioning DB 50, analyze the positioning environment based on the environment analysis data, derive various types of information, visualize the derived information, and deliver the derived information to an LBS platform service provider.

The information used for environment analysis to effectively analyze the positioning environment is not limited to the positioning DB 50, but the collected data may be loaded directly from the collection server 30, and positioning data that is acquired for site verification or that is transferred from the user terminal 70 may also be utilized as the data. This is illustrated in FIG. 2 by the dotted line. The data that includes the positioning DB 50 and that is used for the analysis of location determination performance is hereinafter referred to as "environment analysis data".

Information provided via the positioning environment analysis apparatus 60 includes the basic positioning environmental information of a service area, location determination performance values for respective points or paths obtained by processing the environment analysis data, predicted positioning weak points or regions based on the results of analyzing the location determination performance, a location determination scheme that can obtain optimal performance in the environment of a designated service area based on environment analysis data, a combination of parameters in that scheme, etc.

Further, the function of visualizing the derived information means that various analysis results are visualized in various forms to accomplish the above object of the present invention, and a visualization scheme is not limited to any specific scheme. Auxiliary information for visualization may include an indoor map DB loading function for using the indoor map of the service area. An example of the screen configuration for effectively showing the derived information based on the analysis results and the map of the designated service area will be described later in the following <Embodiments>.

As another form of visualization, a function of calculating the statistical information of error analysis results such as a Cumulative Distribution Function (CDF) of predicted location estimation errors based on the analysis results, and visualizing and providing the statistical information is also included.

As another form of the above-described embodiment, a function of not only displaying the analysis results on a screen, but also maintaining the analysis results in the form of logs is also included.

Further, the function of delivering the derived information to the service provider of the LBS platform 20 does not necessarily entail the delivery of information either via wired or wireless communication or by providing logs. That is, it is also possible for a service provider who constructs or controls a platform to be provided with the visualized information by personally checking the visualized information.

Meanwhile, in order to analyze a positioning environment and evaluate and predict location determination performance, the positioning environment analysis apparatus 60 includes an environment analysis data loading unit 80, an analysis and prediction unit 82, weak point derivation units 84a and 84b, an optimal system analysis unit 86, a visualization unit 88, and a feedback unit 90, as shown in FIG. 4.

The environment analysis data loading unit 80 loads environment analysis data from the collection server 30, the positioning DB 50, and the user terminal 70.

The analysis and prediction unit 82 evaluates and predicts location determination performance values for respective points in a service area for respective positioning resources by directly utilizing or processing pieces of environment analysis data.

Here, the analysis and prediction unit 82 includes a basic positioning environment analysis unit 82a, a location determination performance prediction unit 82b, and a positioning data-based analysis unit 82c.

The basic positioning environment analysis unit 82a determines the present state of positioning resources, such as distribution of positioning resources by directly utilizing and analyzing environment analysis data.

The information analyzed by the basic positioning environment analysis unit 82a may include information such as locations at which patterns are generated for respective positioning resources, the average RSSI values of signals collected for respective points in the case of positioning resources such as Wi-Fi and Bluetooth, the number of transmitters (APs for Wi-Fi) for transmitting signals, the degree of skew relative to the true (correct) direction in the case of positioning resources such as a magnetometer, and the difference from the average air pressure of the entire floor in the case of positioning resources such as a barometer.

As an additional embodiment of the provision of the above-described information, information, such as the average RSSI values for respective points or the number of transmitters, may be discretized and divided into layers, and the divided information may be provided.

Assuming a location determination system that exclusively uses Wi-Fi, it is general for an average RSSI value to be high, for the number of APs from which information can be received to be large, and for location determination performance to be excellent. Therefore, this information may be utilized and provided without change. Alternatively, information may be discretized and divided into levels, such as a point corresponding to −90 to −80 dBm and a point corresponding to −80 to −70 dBm, and the divided levels may be provided and illustrated, whereby such information may be used to represent the relative accuracy of location determination performance in the service area.

The location determination performance prediction unit 82b derives location determination performance that is predicted when various positioning resources are used either solely or in combination at respective points of the service area by processing and analyzing the environment analysis data. Together with the predicted location determination performance, the location determination performance prediction unit 82b may process the environment analysis data and may predict the estimated location (hereinafter referred to as "predicted estimated location") when performing positioning using various positioning resources, either solely or in combination, at respective points of the service area.

The method for processing and analyzing the environment analysis data is not limited to any specific method. In the following <Embodiments>, an example will be described later in which location determination performance values for respective points are predicted by analyzing the positioning DB 50 and measuring the similarity between patterns of adjacent points, and estimated locations for respective points, which are predicted when the corresponding positioning DB 50 is used, are derived.

Meanwhile, location determination may be simulated for a specific path along which a pedestrian can walk in a service area using a scheme for predicting estimated locations at respective points. A preferred embodiment for this may include the step of selecting a path along which a pedestrian can walk and deriving consecutive points located in the corresponding path, the step of predicting estimated locations at the respective points, and the step of bundling the predicted estimated locations for the consecutive points and visualizing or providing the bundled information.

The positioning data-based analysis unit 82c applies the separate positioning data, provided at the site, together with the positioning DB 50, to various location determination systems, thus deriving the results of positioning at the actual site and the location determination performance that can be obtained from the positioning results. An embodiment, in which the performance of the location determination system is analyzed by utilizing a composite positioning system in which Wi-Fi, a pedestrian navigation sensor, a magnetometer, a barometer, etc. are used based on actual positioning data, will be described later in the following <Embodiments>.

In FIG. 4, the weak point derivation units 84a and 84b derive weak points based on the results of analysis and prediction. The weak point derivation unit 84a may derive (calculate) points having poor location determination performance (i.e. weak points) based on the results of analysis by the basic positioning environment analysis unit 82a. The weak point derivation unit 84b may derive (calculate) points having poor location determination performance (i.e. weak points) based on the results of analysis by the location determination performance prediction unit 82b and the positioning data-based analysis unit 82c.

The criteria for calculating the above-described points, having poor location determination performance, may be selected as absolute or relative criteria.

The optimal system analysis unit 86 may evaluate location determination performance values for respective settings by substituting different parameters into respective location determination schemes and performing simulation, upon analyzing location determination performance, and may calculate an optimal location determination scheme and optimal parameter set values based on the results of the evaluation.

That is, the optimal system analysis unit 86 predicts location determination performance based on various location determination schemes and set values, and derives predicted location determination performance values depending on location determination schemes that are usable at respective points in the service area and the parameter values set in respective schemes. The optimal system analysis unit 86 compares the derived location determination performance values with each other, and provides the combination of location determination scheme and parameter information that exhibit optimal performance.

For example, when a system using Wi-Fi is applied to an environment in which various positioning resources are usable, if it is determined that the performance of a K-Nearest Neighbor (k-NN) algorithm obtained at K=3 is best, the corresponding information may be provided.

The positioning resources and system which are to be analyzed are not limited, and various location determination schemes, which are used either solely or in combination for various positioning resources, may be analyzed.

In FIG. 4, the visualization unit 88 displays the results obtained by the analysis and prediction unit 82, the weak point derivation units 84a and 84b, and the optimal system analysis unit 86, and records the logs thereof.

In FIG. 4, when it is desired to deliver the results obtained by the analysis and prediction unit 82, the weak point derivation units 84a and 84b, and the optimal system analysis unit 86 to a service provider in a wired or wireless manner, the feedback unit 90 provides the corresponding results to the service provider.

Embodiments

Figure 5:
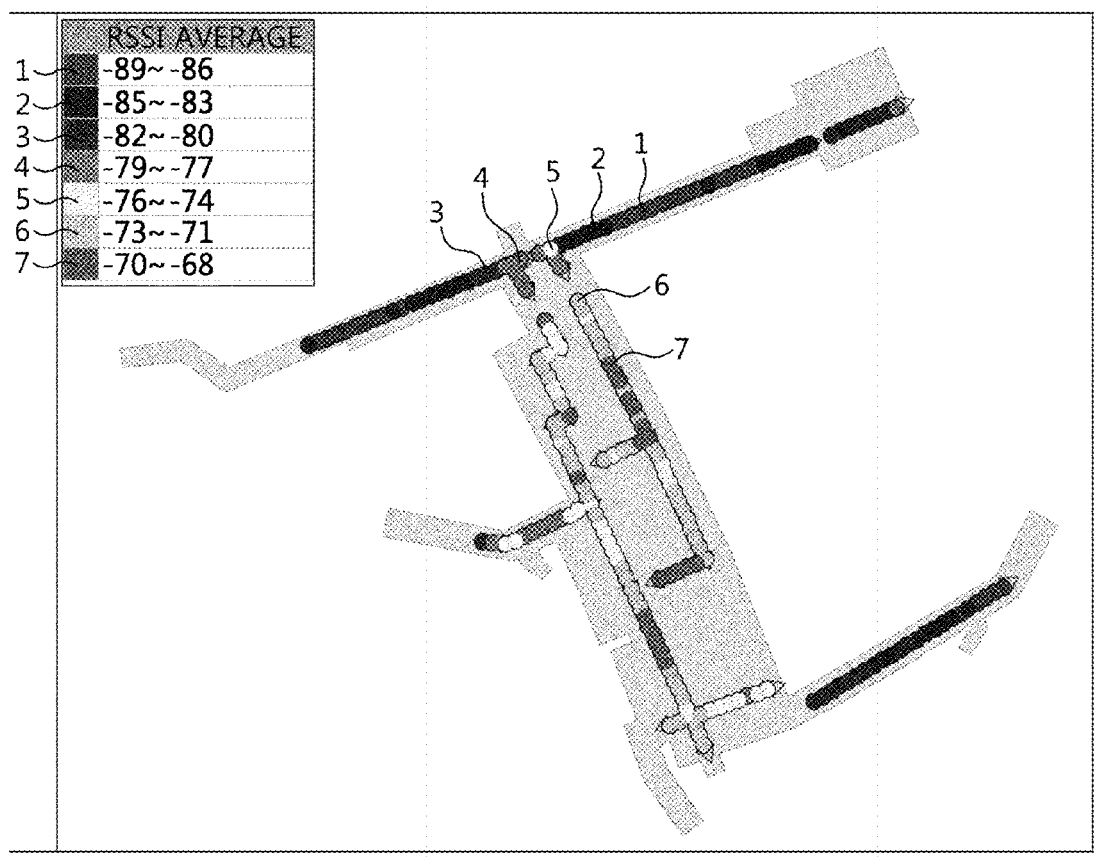
FIG. 5 is a diagram showing an embodiment of a preferred screen configuration for positioning environment analysis.
Figure 6:
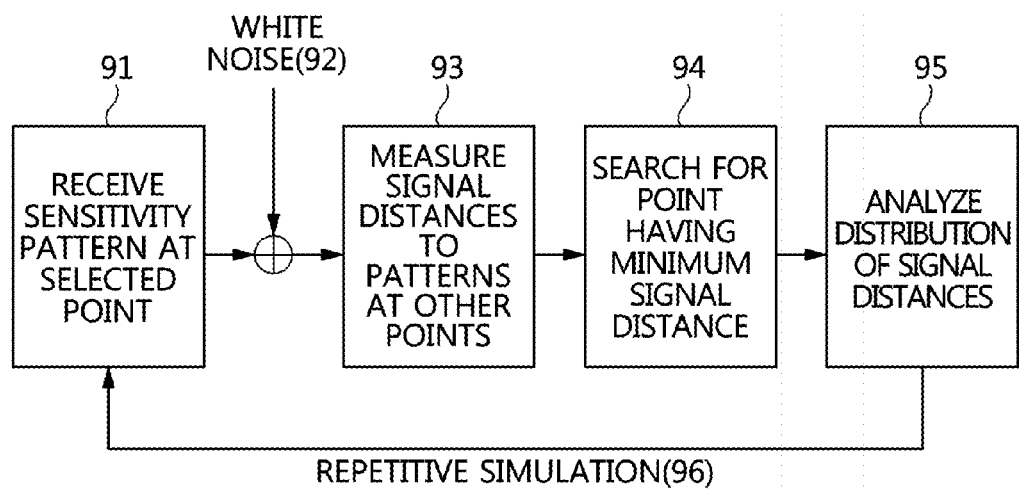
FIG. 6 is a diagram showing an embodiment of a scheme for predicting location determination performance based on similarity with respect to a single point selected in the positioning DB.
Figure 7:
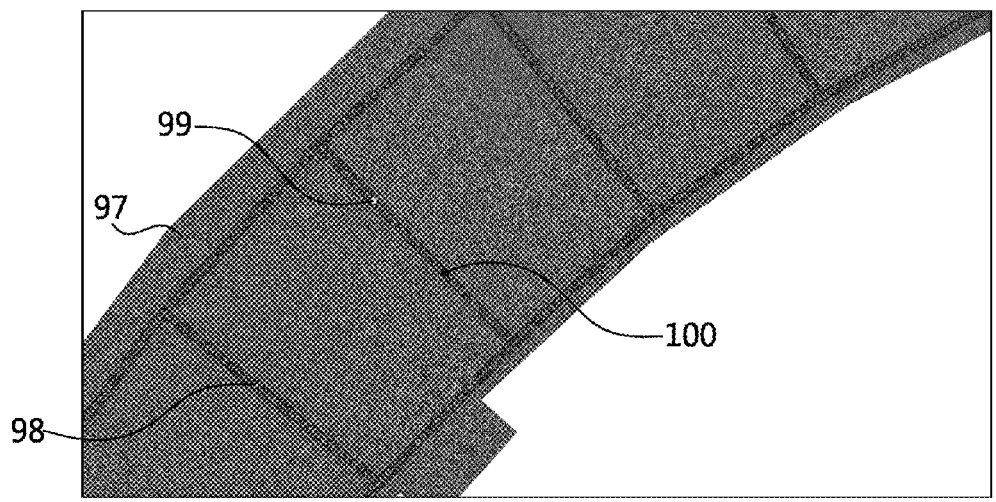
FIG. 7 is a diagram of an embodiment showing a predicted estimated location when positioning is performed on a selected point.
Figure 8:
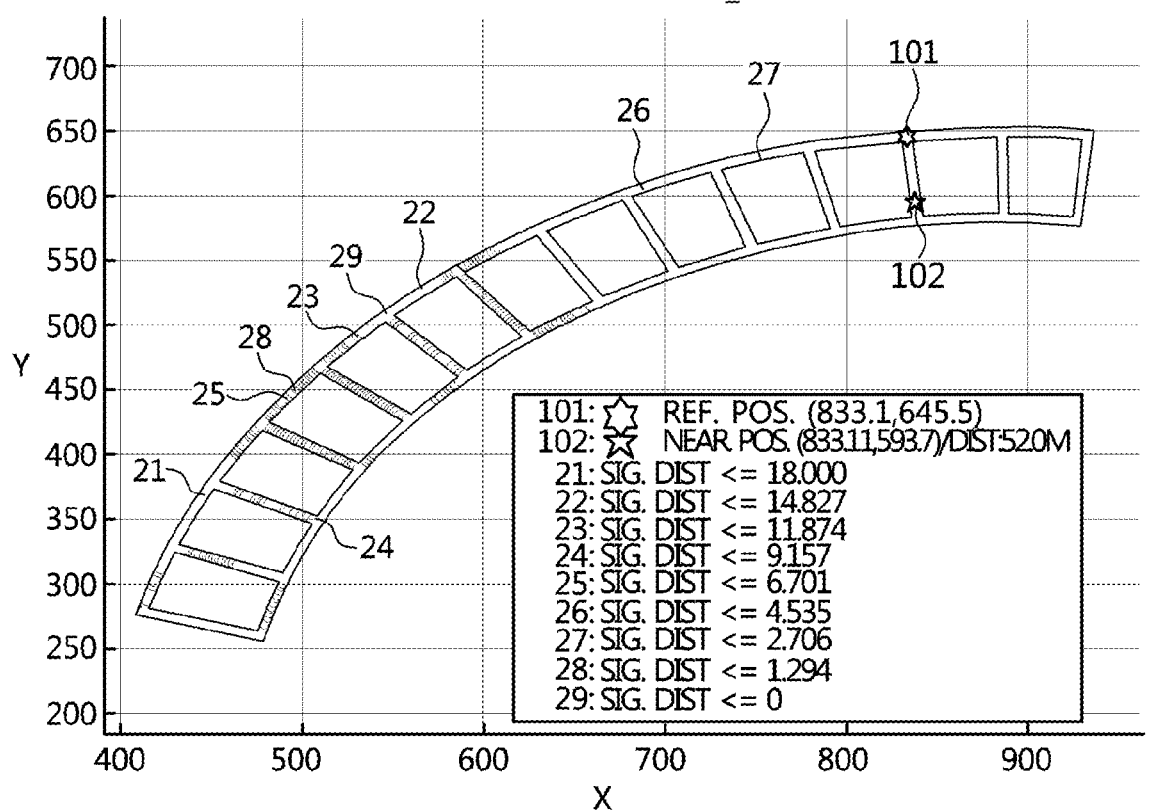
FIG. 8 is a diagram of an embodiment showing the distribution of signal distances between the selected point and other points.
Figure 9:
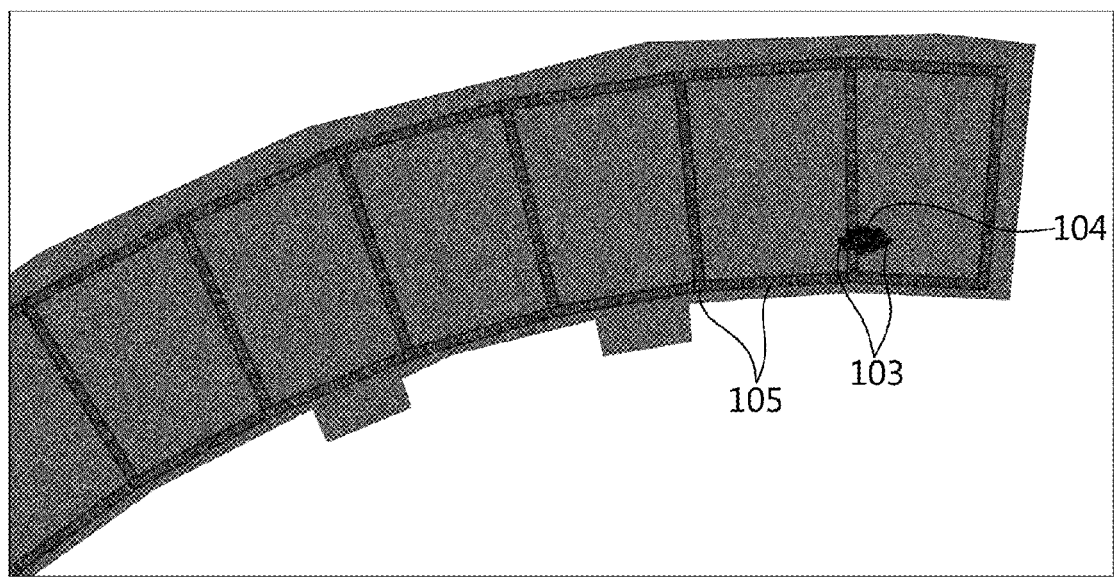
FIG. 9 is a diagram of an embodiment showing the results of location determination by a positioning system using a particle filter based on a positioning log.
Figure 10:
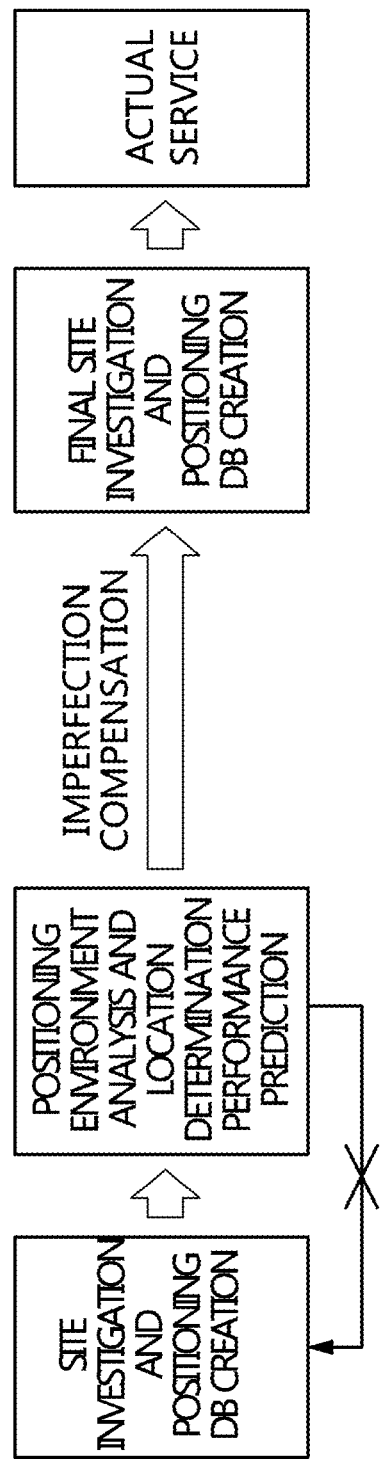
FIG. 10 is a diagram employed in the description of an LBS platform construction procedure for LBS according to an embodiment of the present invention.
Figure 11:
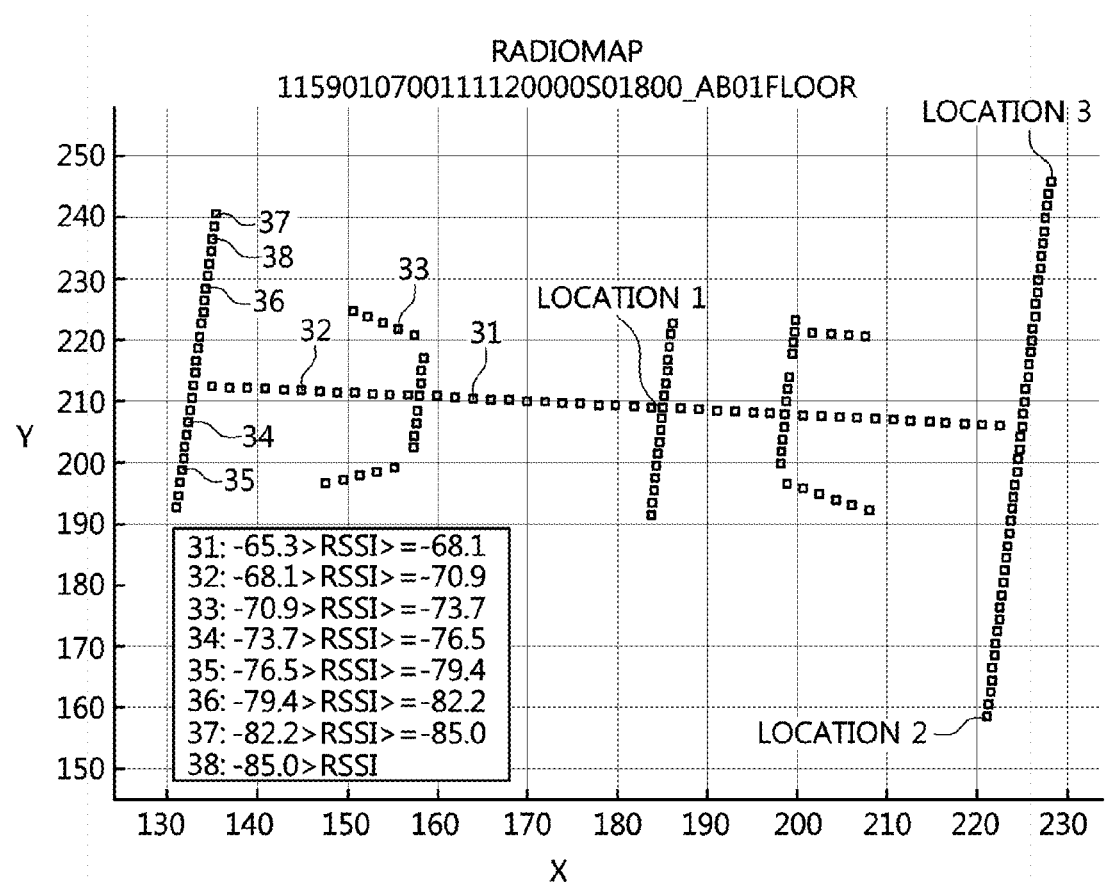
FIG. 11 is a diagram showing an example in which average RSSI values of Wi-Fi signals in a service area are discretized and indicated.
Figure 12:
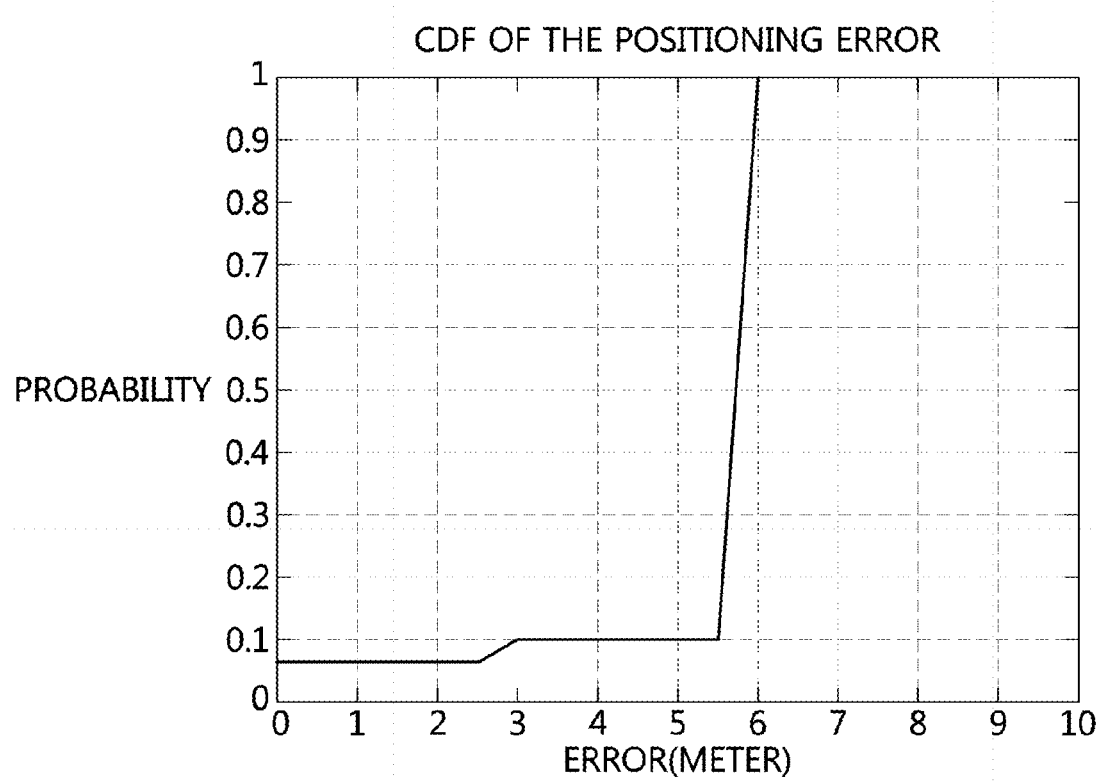
FIGS. 12 and 13 are graphs illustrating the results of positioning at points where different numbers of Wi-Fi APs are present.
Figure 13:
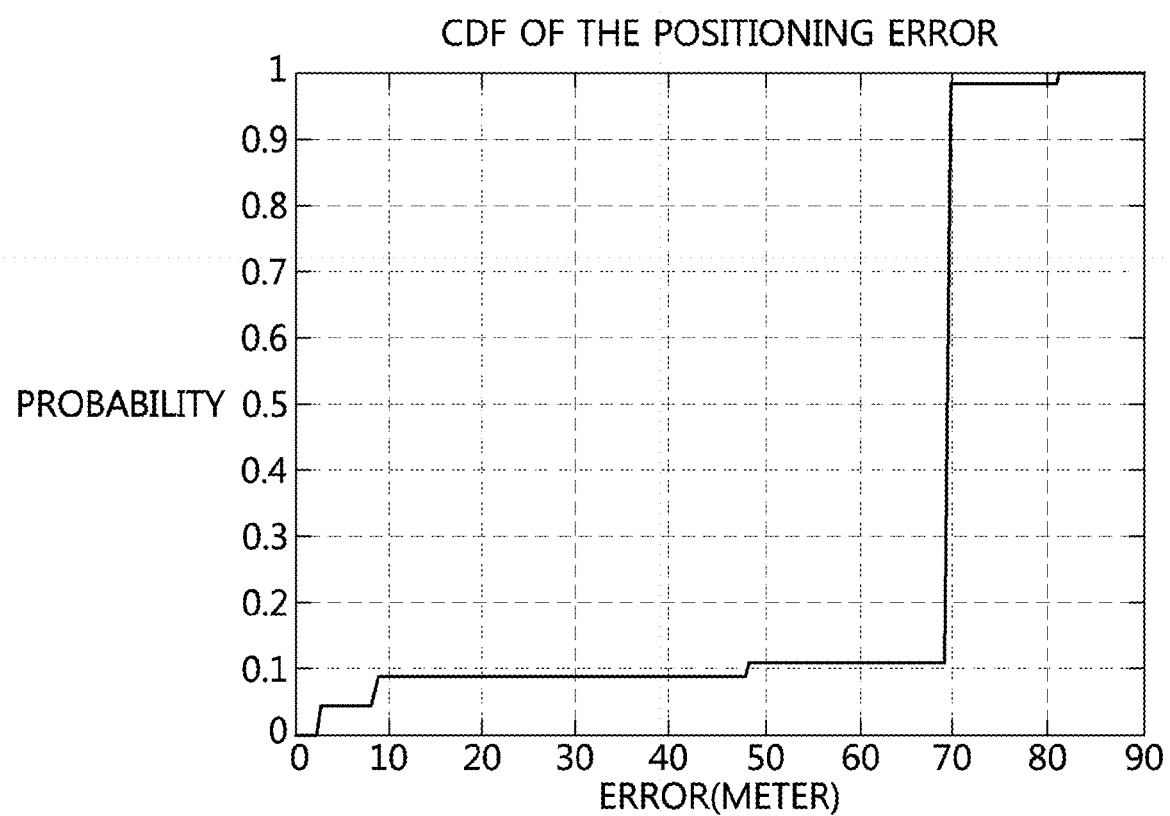
Figure 14:
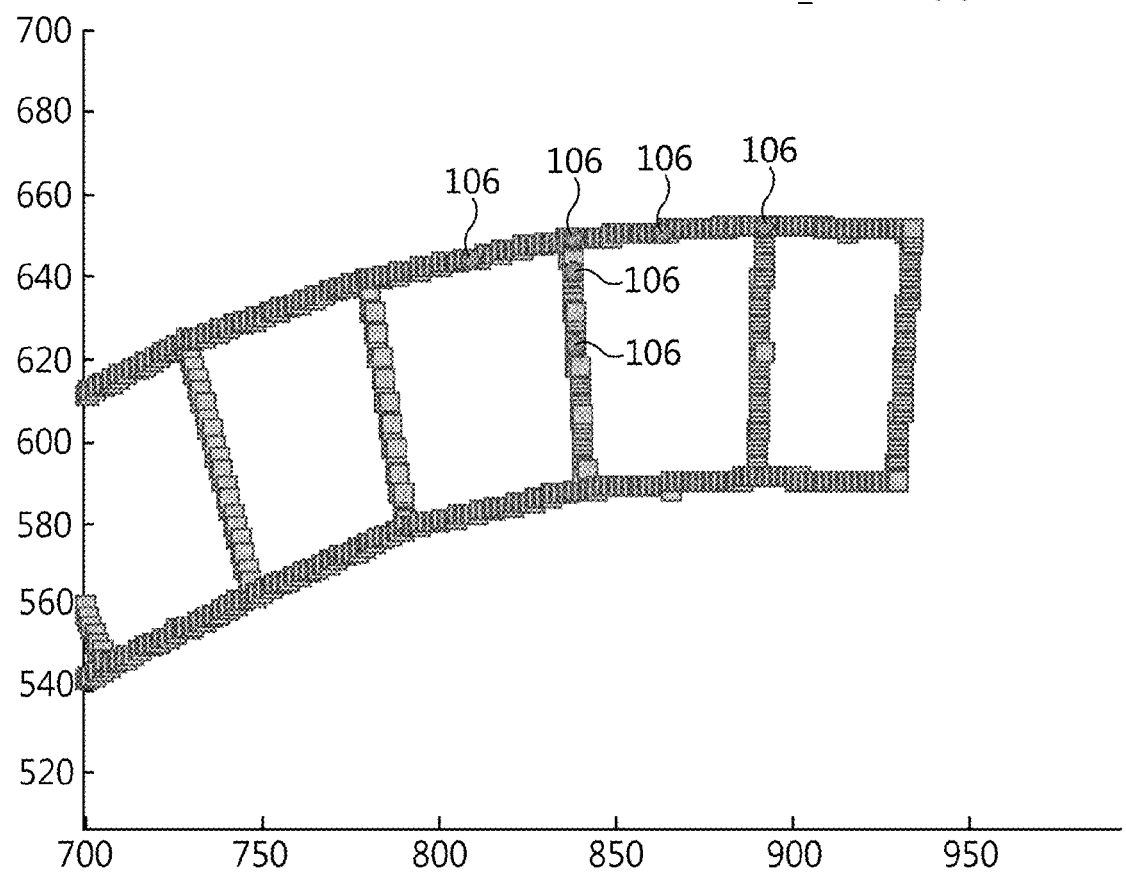
FIG. 14 is a diagram illustrating the results of positioning according to an embodiment of the present invention.

FIG. 5 is a diagram showing an embodiment of a preferred screen configuration for positioning environment analysis, FIG. 6 is a diagram showing an embodiment of a scheme for predicting location determination performance based on similarity with respect to a single point selected in the positioning DB, FIG. 7 is a diagram of an embodiment showing a predicted estimated location when positioning is performed on a selected point, FIG. 8 is a diagram of an embodiment showing the distribution of signal distances between the selected point and other points, FIG. 9 is a diagram of an embodiment showing the results of location determination by a positioning system using a particle filter based on a positioning log, FIG. 10 is a diagram employed in the description of an LBS platform construction procedure for LBS according to an embodiment of the present invention, FIG. 11 is a diagram showing an example in which average RSSI values of Wi-Fi signals in a service area are discretized and indicated, FIGS. 12 and 13 are graphs illustrating the results of positioning at points where different numbers of Wi-Fi APs are present, and FIG. 14 is a diagram illustrating the results of positioning according to an embodiment of the present invention.

A preferred embodiment of visualization in the analysis of a basic positioning environment performed by the basic positioning environment analysis unit 82a may be illustrated in FIG. 5. FIG. 5 illustrates an embodiment in which visualization is implemented by discretizing average RSSI values of Wi-Fi signals received for respective points and distinguishing respective sections using different colors, based on positioning DBs created via site investigation in a single actual indoor space.

In order to effectively provide information through the prediction system, the basic positioning environment analysis unit 82a provides indoor map information, represented by a drawing of indoor space or the like, indicates points at which pointing DBs are created in the map, marks pieces of information (e.g. average RSSI values), desired to be analyzed when respective points are indicated, differently (e.g. in different colors) depending on the levels, and provide examples thereof.

In accordance with FIG. 5, as sequential positions become lower, i.e. progress through 7-6-5-4-3, points having lower average RSSI values are shown, and are depicted together with numeric values in the example in the upper left portion of FIG. 5.

Upon indicating pieces of information showing different levels in colors or the like, Wi-Fi signals are not necessarily shown, but other types of information, which are digitized and stored in the positioning DBs, for example, RSSI values in a Bluetooth network or a mobile communication network, and values on x, y, and z axes on a magnetometer, may also be shown.

When geomagnetic information is added and the direction information of a magnetic compass for respective points is acquired, the direction is indicated in the form of a line or an arrow having a predetermined length from each point at which the positioning DB 50 is created. The reason for this is to transfer direction information included in the positioning DB 50, and the shape of the line for indicating the direction is not especially limited.

To more accurately transfer information, numerical value information may be directly marked in addition to discretized colors. This may be implemented using a scheme for providing information in the form of a separate table or for marking corresponding numerical values in text on the respective points.

By utilizing the results of analysis of the basic positioning environment provided in this way, availability information, which is obtainable when each positioning resource is utilized and which is one of the elements of location determination performance, may be provided. That is, when positioning resources are not collected from a specific area and cannot be utilized, information about the lack of availability may be provided.

Meanwhile, the location determination performance prediction unit 82b analyzes the similarity between patterns of respective points generated in the positioning DB 50 using a K-Nearest Neighbor (K-NN) algorithm, and predicts location determination performance values for respective points. The scheme for analysis and prediction is described as follows.

The K-NN algorithm, which is one of the techniques generally utilized in pattern comparison-based positioning, compares the pattern of a signal received by the user with the receive sensitivity patterns of the DB to determine the similarity therebetween, and determines the place at which the most similar pattern is located to be the user's location. Here, the similarity between patterns (hereinafter also referred to as a "signal distance") may be measured by obtaining the distance between two patterns in a vector space when the two patterns are represented by vectors, that is, a Euclidean distance. The equation for calculating the signal distance between a receive sensitivity pattern at an m-th point in the positioning DB 50 and the signal received by the user is represented by the following Equation (1):

$$S_m = \sqrt{\sum_{i=0}^{n} (r_i - p_{i,m})^2} \quad (1)$$

where $r_i$ denotes the pattern of the signal received by the user, $p_{i,m}$ denotes the receive sensitivity pattern mapped to an m-th point in a Radio Frequency (RF) fingerprint map, and n denotes the number of vector components forming the pattern. When Wi-Fi is utilized, signals received from respective APs are vector components, and thus the number of Wi-Fi APs from which signals are received is n. Since the signal distance is calculated as the sum of differences between respective vector components, a short distance (i.e. a small value of s) means that the receive sensitivity patterns are similar to each other.

Since the K-NN algorithm is used to measure similarity between patterns, the present embodiment uses the signal distance measurement scheme that is used in the K-NN algorithm so as to measure the similarity between patterns and predict location determination performance based on the measured similarity. Accordingly, as a scheme for predicting location determination performance based on similarity with respect to a single point selected in the positioning DB, there may be provided a scheme including the step 91 of selecting one point (hereinafter referred to as "a selected point") from among the points for which the positioning DB 50 is constructed and acquiring a receive sensitivity pattern from the selected point, the step 93 of measuring signal distances from the receive sensitivity pattern of the selected point to the receive sensitivity patterns at other points, the step 94 of searching for the point having the shortest signal distance, and the step 95 of analyzing location determination performance based on the distribution of the signal distances, as shown in FIG. 6.

In FIG. 6, to more accurately predict location determination performance, the step 92 of adding certain noise to the receive sensitivity pattern at the selected point and the step 96 of performing repetitive simulation and analysis may be included in the scheme.

When the location determination performance prediction unit 82b predicts location determination performance, the estimated location predicted when positioning is performed at the selected point may be derived (calculated) as the point having the most similar pattern (i.e. having the shortest signal distance).

In the prediction of location determination performance based on repetitive simulation, included as an additional example, predicted estimated locations may be derived differently in every simulation due to the certain white noise added to the receive sensitivity pattern at the selected point. By using this phenomenon, simulation in which different types of white noise are added is performed a sufficient number of times, and predicted estimated locations are calculated, so that statistical values such as the average or standard deviation of location estimation errors of the predicted estimated locations may be estimated as the location determination performance of the corresponding point.

Meanwhile, at the step 95 of analyzing the location determination performance based on the distribution of signal distances, the range of points having similarity of a predetermined level or more is expected to be a false estimation range for location determination in consideration of the fact that the location of the user may be estimated to be a point having a similar pattern due to the disturbance of signals. Here, the criteria for determining the range of similarity estimated to be the false estimation range are not limited. The standard deviation of receive sensitivity, occurring when signals are received in an actual designated service area or a normal environment similar thereto, may be utilized as the criteria.

When the false estimation range for location determination is derived according to the embodiment, the average of the distances between the actual (true) location and respective points falling within the corresponding range is calculated, and is provided as the reliability of location determination. Information that can be provided as reliability does not necessarily include only the average value, as described above. A method of measuring the distance between the farthest point in the corresponding range and the true location may be used, and a method of illustrating the distribution of points having similar patterns via visualization may also be included.

When embodiments that may be implemented by aggregating the proposed examples are summarized, the error at a given location is estimated using the average of location errors obtained via repetitive simulations in which white noise is added to respective points, and reliability is estimated using the maximum distance of the false estimation range, estimated in the absence of noise.

When the scheme for predicting location determination performance at a single point using both the above-described embodiment and the scheme shown in FIG. 6 is repeatedly performed on all points for which the positioning DB 50 is created, it is possible to analyze location determination performance over the entire service area.

In the above embodiment, as the receive sensitivity patterns, the patterns in the positioning DB 50 are not necessarily the only patterns that are utilized, but all environment analysis data may be utilized.

Meanwhile, according to the embodiment in which similarity-based location determination performance is predicted, the step of searching for the point having the shortest signal distance to the receive sensitivity pattern at the selected point without adding noise and deriving the found point as the estimated location upon conducting positioning is performed. A preferred example of screen configuration for visualizing this step is illustrated in FIG. 7.

In FIG. 7, reference numeral 97 denotes the outward appearance of an indoor space, and points 98 denote representative points for which the positioning DB 50 is created. In FIG. 7, a point 99 denotes a selected point (a point at which it is desired to check location determination performance), and a point 100 denotes an estimated location, which is predicted when positioning is performed on the point 99.

Further, an embodiment of screen configuration for visualizing and presenting the distribution of signal distances between the selected point and other points to the user is illustrated in FIG. 8.

In FIG. 8, a hexagonal star 101 denotes a reference point, the positioning quality of which is desired to be known, a pentagonal star 102 denotes a predicted estimated location, and remaining points 21 to 29 denote points for which the positioning DB 50 is created. It can be seen that, as points in the sequence progress through 28-27-26-25-24-23-22-21, signal distances between patterns at the points and the pattern at the reference point become greater. That is, the point 28 denote points exhibiting considerably high similarity because signal distances of the patterns at the points to the pattern of the reference point are very short. These points are points falling within the false estimation range for location determination. As described above, the distance to the farthest point among these points may be measured, or information about the distribution of points falling within the false estimation range, such as the statistical values of the distances between the point 28 and the true point, may be provided as the reliability of location determination.

The index that can be used by the location determination performance prediction unit 82b by processing environment analysis data to perform analysis is not limited to similarity between patterns. For example, in the system using Wi-Fi, the number of APs in a matching pattern between adjacent points in the positioning DB 50 may be utilized.

Meanwhile, a preferred embodiment of the visualization of positioning data-based analysis by the positioning data-based analysis unit 82c may be illustrated in FIG. 9.

FIG. 9 illustrates results obtained when positioning is performed by configuring a particle filter for determining the location of the user using Wi-Fi, a magnetometer, a pedestrian navigation sensor, a barometer, etc. based on a positioning log that is collected separately from the positioning DB 50, which is constructed in an actual indoor space.

In FIG. 9, points 103 denote the locations of particles set for location determination, and the middle point 104 denotes a determined location value. Points 105 denote points at which positioning DBs 50 are constructed. When true location information is acquired for additional information transfer, the location information may be depicted, and the distance to the estimated location may be measured and indicated. Here, for accurate transfer, the true location and the estimated location may be connected to each other through a line segment and then depicted.

By means of the above-described present invention, positioning environments that are different for respective service areas may be efficiently analyzed at low cost, and thus location determination performance that includes location determination accuracy, reliability, and availability may be determined. Further, the cause of given environmental limitations may be detected and may then be used as information required to overcome the environmental limitations. Further, the optimal location determination performance that may be acquired in a given area and the location determination scheme that must be used to realize the optimal performance may be easily checked. Therefore, repetitive site investigation and site verification, which were described with reference to FIG. 1, are not required, thus minimizing the expense required to construct a platform. By means of this procedure, the improved procedure for constructing a location determination platform may be illustrated in FIG. 10.

Thanks to the improved procedure, a robust location determination system or platform that is less influenced by the positioning environment of a service area may be ultimately constructed. That is, even in a poor positioning environment, measures or a location determination system configuration capable of realizing optimal performance may be rapidly and easily found, thus enabling a system for providing location determination performance at a level desired by the user to be constructed anytime and anywhere.

Furthermore, upon providing actual service, the present invention may also be utilized to control the location determination platform. In particular, in the situation in which positioning logs can be acquired from the user, the performance of the location service with which the user is actually provided may be monitored in real time when the service is operated. Thus, if there is a point at which performance is degraded, it is possible to monitor the point and take appropriate measures.

In embodiments for obtaining such advantages, points or regions at which poor positioning is expected may be found via the basic positioning environment analysis unit 82a of the positioning environment analysis apparatus 60, and it is possible to respond to the poor positioning. That is, the environment may be improved by taking an action such as installing an additional AP near the region expected to have poor location determination performance due to excessively low average RSSI. Moreover, it is possible to determine which positioning resources are distributed at respective points, thus enabling the availability of the location determination system that exploits individual resources to be verified.

FIG. 11 illustrates the distribution of RSSI values by discretizing and visualizing the average RSSI values of Wi-Fi signals based on a positioning DB created in a single actual indoor space. As shown in the drawing, location 1 is a region in which Wi-Fi signals are received with high average RSSI, and which is a point having a good positioning environment. Location 2 is a region in which the positioning environment is so poor that the average RSSI of received Wi-Fi signals is less than −85.0 dBm.

When location estimation errors obtained as the result of performing positioning at location 1 and location 2 are represented by a Channel Definition Format (CDF), the location estimation errors are represented, as shown in FIGS. 12 and 13. FIG. 12 illustrates the result of performing positioning at location 1 in CDF, and FIG. 13 illustrates, in the right portion thereof, the result obtained from location 2 in CDF.

At location 1, all positioning results fall within an error range of 6 m, but, at location 2, some positioning results shows an error close to the maximum of 70 to 80 m. The reason for this is that the strength of the signal received at location 2 is very weak and does not exhibit physical characteristics distinguishable from those of neighboring locations, and thus there are many cases where location 2 is falsely estimated to be the neighboring location of location 3 (see FIG. 11), which has an environment similar to location 2. In this case, when APs are installed in regions near location 2 and location 3, respectively, location determination performance may be greatly improved. In this way, basic positioning environmental information is provided by discretizing the average RSSI values of received signals, so that location determination performance may be predicted by means of the provided information. Alternatively, location determination performance levels may be shown by discretizing the number of APs or may be shown in consideration of various types of information in combination.

Meanwhile, in the embodiments for obtaining the above-described advantages, the location determination performance prediction unit 82*b* of the positioning environment analysis apparatus 60 processes and analyzes environment analysis data, unlike the basic positioning environment analysis unit 82*a* which provides information by utilizing some of the environment analysis data without change, thus more accurately providing information about predicted location determination performance. That is, information about the physical characteristics used by an actual location determination system, in particular, the location determination system using a pattern DB, may be analyzed, thus enabling digitized location determination performance to be more accurately predicted.

Here, considering the characteristics of signals that are generally received by the user in an actual environment, the physical environment near the user is not always perfectly stationary, but naturally dynamically varies. Further, due to factors such as thermal noise occurring in a receiver itself, variation (i.e. disturbance) occurs in receive sensitivity.

In the location determination system that uses a pattern DB, the location of the user is estimated to be the point having the most similar pattern, and thus the determined location of the user also continuously varies as the receive sensitivity varies. In this case, as the range of points having a similar pattern is widened, the breadth of variation in the estimated location is also increased. Therefore, when points having similarity of a predetermined level or more are found, a false estimation range may be predicted, and thus the embodiment for comparing signal distances to predict the false estimation range has been provided.

FIG. 14 illustrates the results of performing positioning on a selected point, indicated by the hexagonal star 101 in FIG. 8. It can be seen that, as the distribution of points having similar patterns is wider, locations are falsely estimated in a wider area. In reality, the maximum location estimation error is 30 to 50 m, which is similar to the degree of distribution of the point 28 of FIG. 8, indicated in the prediction of similarity-based location determination performance.

Since the positioning data-based analysis unit 82*c* of the positioning environment analysis apparatus 60, which is an additional embodiment, utilizes data acquired by the user actually provided with service, there are advantages in that location determination performance may be more accurately derived, and in that precise analysis may be performed on various applicable positioning systems.

Figure 15:
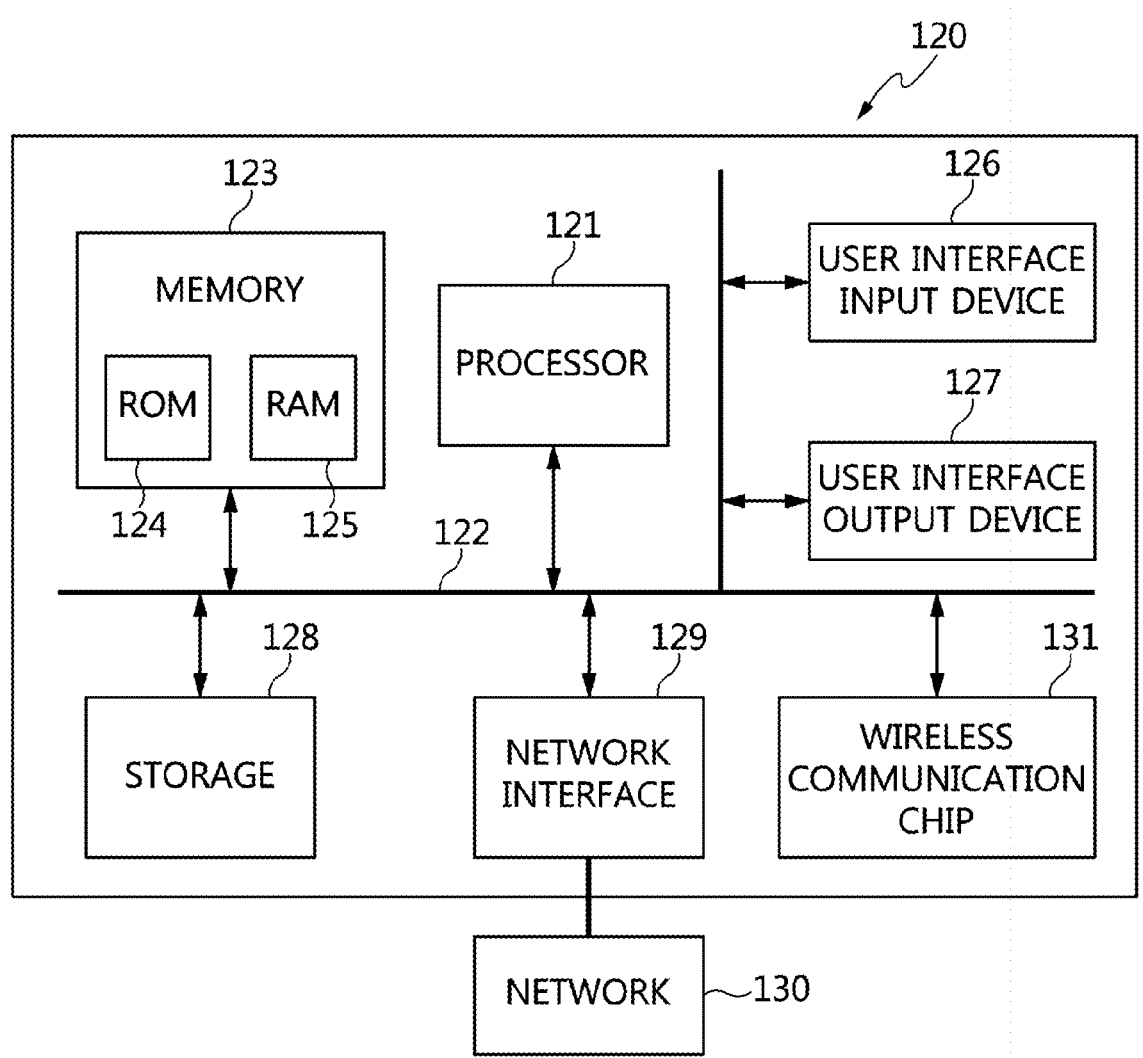
FIG. 15 is a diagram showing a computer system in which the embodiment of the present invention is implemented.

Meanwhile, the embodiment of the present invention may be implemented in a computer system. As shown in FIG. 15, a computer system 120 includes one or more processors 121, memory 123, a user interface input device 126, a user interface output device 127, and storage 128, which communicate with each other through a bus 122. The computer system 120 may further include one or more network interfaces 129 connected to a network 130. Each processor 121 may be a Central Processing Unit (CPU) or a semiconductor device for executing processing instructions stored in the memory 123 or the storage 128. Each of the memory 123 and the storage 128 may be any of various types of volatile or nonvolatile storage media. For example, the memory 123 may include Read Only Memory (ROM) 124 or Random Access Memory (RAM) 125.

Further, when the computer system 120 is implemented in a small-sized computing device in preparation for the IoT age, if an Ethernet cable is connected to the computing device, the computing device may function as a wireless sharer, so that a mobile device may be coupled in a wireless manner to a gateway to perform encryption/decryption functions. Therefore, the computer system 120 may further include a wireless communication chip (WiFi chip) 131.

Therefore, the embodiment of the present invention may be implemented as a non-temporary computer-readable storage medium in which a computer-implemented method or computer-executable instructions are recorded. When the computer-readable instructions are executed by a processor, the instructions may perform the method according to at least one aspect of the present invention.

In accordance with the present invention having the above configuration, an indoor positioning environment is analyzed based on collected data and a positioning DB constructed using the collected data, so that the location determination performance of a designated service area may be predicted, and weak points may be detected, and thus a solution for weak points may be derived. Further, a location determination scheme enabling optimal positioning in a given environment may be analyzed.

A service provider may analyze the positioning environment of a site before service is provided, and may determine the degree of accuracy that can be obtained when a certain location determination scheme is used in a given environment.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A positioning environment analysis apparatus, comprising:
    an environment analysis data loading unit for loading environment analysis data to be used for analysis of location determination performance from one or more of a collection server, a positioning database (DB), and a user terminal; and
    an analysis and prediction unit for evaluating and predicting, based on the environment analysis data, location determination performance values for respective points in a service area, for respective positioning resources,
    wherein the analysis and prediction unit comprises:
        a basic positioning environment analysis unit for detecting a present state of distribution of the positioning resources by directly utilizing and analyzing the environment analysis data;
        a location determination performance prediction unit for deriving the location determination performance values that are predicted when the positioning resources are used at the respective points in the service area by processing and analyzing the environment analysis data; and
        a positioning data-based analysis unit for deriving both results of performing positioning at an actual site based on the environment analysis data, and location determination performance that is capable of being obtained from the results of performing positioning.

2. The positioning environment analysis apparatus of claim 1, wherein the information analyzed by the basic positioning environment analysis unit comprises one or more of locations where patterns are generated for respective positioning resources, average Received Signal Strength Indicator (RSSI) values of signals collected for respective points, a number of transmitters for transmitting signals, a degree of skew relative to a true direction, and a difference from an average air pressure of an entire floor.

3. The positioning environment analysis apparatus of claim 1, wherein the location determination performance prediction unit predicts the location determination performance values by analyzing similarity between patterns of respective points constructed in the positioning DB.

4. The positioning environment analysis apparatus of claim 3, wherein the location determination performance prediction unit is configured to measure signal distances from a receive sensitivity pattern at a point selected from among points for which the positioning DB is constructed, to receive sensitivity patterns at other points, search for a point having a shortest signal distance, and analyze the location determination performance values based on a distribution of the signal distances, wherein the similarity corresponds to the signal distances.

5. The positioning environment analysis apparatus of claim 4, wherein the location determination performance prediction unit adds certain noise to the receive sensitivity pattern at the selected point and repetitively simulates analysis of the location determination performance.

6. The positioning environment analysis apparatus of claim 4, wherein the location determination performance prediction unit additionally predicts an estimated location when positioning is performed using the positioning resources at respective points of the service area by processing the environment analysis data.

7. The positioning environment analysis apparatus of claim 1, further comprising:
   a weak point derivation unit for deriving weak points having poor location determination performance based on results obtained by the analysis and prediction unit; and
   an optimal system analysis unit for deriving, based on various location determination schemes and set values, location determination performance values that are predicted depending on location determination schemes usable at the respective points in the service area and parameter values set in respective schemes, comparing the derived location determination performance values with each other, and then providing a location determination scheme and parameter information that exhibit optimal performance.

8. The positioning environment analysis apparatus of claim 7, further comprising:
   a visualization unit for displaying results obtained by the analysis and prediction unit, the weak point derivation unit, and the optimal system analysis unit; and
   a feedback unit for feeding back the results obtained by the analysis and prediction unit, the weak point derivation unit, and the optimal system analysis unit to a service provider.

9. A method for predicting location determination performance of a terminal, the method comprising:
   loading, by a positioning environment analysis apparatus, environment analysis data to be used for analysis of location determination performance from one or more of a collection server, a positioning DB, and a user terminal; and
   evaluating and predicting, by the positioning environment analysis apparatus, location determination performance values for respective points in a service area, for respective positioning resources, based on the environment analysis data,
   wherein evaluating and predicting the location determination performance values comprises:
      detecting a present state of distribution of the positioning resources by directly utilizing and analyzing the environment analysis data;
      deriving the location determination performance values that are predicted when the positioning resources are used at the respective points in the service area by processing and analyzing the environment analysis data; and
      deriving both results of performing positioning at an actual site based on the environment analysis data, and location determination performance that is capable of being obtained from the results of performing positioning.

10. The method of claim 9, wherein deriving the predicted location determination performance values is configured to predict the location determination performance values by analyzing similarity between patterns of respective points constructed in the positioning DB.

11. The method of claim 10, wherein deriving the predicted location determination performance values comprises:
   acquiring a receive sensitivity pattern of a point selected from among points for which the positioning DB is configured;
   measuring signal distances from the acquired receive sensitivity pattern at the selected point to receive sensitivity patterns at other points, and searching for a point having a shortest signal distance; and
   analyzing the location determination performance values based on a distribution of the signal distances,
   wherein the similarity corresponds to the signal distances.

12. The method of claim 11, wherein deriving the predicted location determination performance values further comprises:
   adding certain noise to the receive sensitivity pattern at the selected point,
   wherein the analysis of the location determination performance is repetitively simulated.

13. The method of claim 9, further comprising, after evaluating and predicting the location determination performance values:
   deriving weak points having poor location determination performance; and
   deriving, based on various location determination schemes and set values, location determination performance values that are predicted depending on location determination schemes usable at the respective points in the service area and parameter values set in respective schemes, comparing the derived location determination performance values with each other, and then providing a location determination scheme and parameter information that exhibit optimal performance.

14. The method of claim 13, further comprising:
   displaying results obtained from the evaluating and predicting the location determination performance values, the deriving the weak points having poor location determination performance, and the providing the location determination scheme and parameter information that exhibit the optimal performance; and
   feeding back the results, obtained from the evaluating and predicting the location determination performance values, the deriving the weak points having poor location determination performance, and the providing the location determination scheme and parameter information that exhibit the optimal performance, to a service provider.

15. A system for predicting location determination performance of a terminal, the system comprising:
one or more collection devices for acquiring collected data that includes information about positioning resources for respective points;
a Location-Based Service (LBS) platform including a collection server for receiving the collected data from the one or more collection devices, and arranging and storing the collected data in a database (DB), and a positioning DB creation device for analyzing and processing the positioning resource information and creating a positioning DB to be used for location determination; and
a positioning environment analysis apparatus for loading environment analysis data from one or more of the collection server, the positioning DB, and a user terminal, and evaluating and predicting, based on the environment analysis data, location determination performance values for respective points in a service area, for respective positioning resources,
wherein the positioning environment analysis apparatus comprises:
a basic positioning environment analysis unit for detecting a present state of distribution of the positioning resources by directly utilizing and analyzing the environment analysis data;
a location determination performance prediction unit for deriving the location determination performance values that are predicted when the positioning resources are used at the respective points in the service area by processing and analyzing the environment analysis data; and
a positioning data-based analysis unit for deriving both results of performing positioning at an actual site based on the environment analysis data, and location determination performance that is capable of being obtained from the results of performing positioning.

16. The system of claim 15, wherein each of the collection devices periodically acquires information about times at which collection was performed, collection coordinates, and positioning resources, configures the collected data by bundling the acquired information into a single unit, stores the collected data, and transfers the collected data to the collection server.

17. The system of claim 15, wherein the positioning DB creation device derives representative points at which patterns are to be generated, generates patterns for respective points using collected data near each representative point, and then creates the positioning DB.

18. The system of claim 17, wherein the positioning DB creation device is configured to:
check the collected data received from the collection server, analyze collection coordinates, and then derive the representative points,
generate patterns by bundling collected data near each representative point and by obtaining averages of pieces of measured information for respective positioning infrastructure elements included in respective pieces of data, and
create the positioning DB by bundling patterns generated at all representative points.

* * * * *